(12) United States Patent
Kwon (10) Patent No.: US 9,156,503 B2
(45) Date of Patent: Oct. 13, 2015

(54) MOUNTING STRUCTURE OF FENDER SIDE COVER

(71) Applicant: Kia Motors Corporation, Seoul (KR)

(72) Inventor: O-Sung Kwon, Anyang-Shi (KR)

(73) Assignee: KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/536,545

(22) Filed: Nov. 7, 2014

(65) Prior Publication Data

US 2015/0166118 A1 Jun. 18, 2015

(30) Foreign Application Priority Data

Dec. 17, 2013 (KR) .................. 10-2013-0157453

(51) Int. Cl.
*B62D 25/16* (2006.01)
*B62D 25/12* (2006.01)
*E05D 5/02* (2006.01)

(52) U.S. Cl.
CPC .............. *B62D 25/163* (2013.01); *B62D 25/12* (2013.01); *E05D 5/0207* (2013.01)

(58) Field of Classification Search
CPC ...... B62D 25/163; B62D 25/12; E05D 5/043; E05D 5/0207; E05D 5/062
USPC .................. 296/198, 193.11; 180/69.2, 274
See application file for complete search history.

(56) References Cited

U.S. PATENT DOCUMENTS

| 2002/0011365 | A1* | 1/2002 | Sasaki et al. | 180/69.2 |
| 2010/0024170 | A1* | 2/2010 | Lim | 16/365 |
| 2010/0270829 | A1* | 10/2010 | Furumoto | 296/193.11 |
| 2014/0026369 | A1* | 1/2014 | Kim | 16/387 |

FOREIGN PATENT DOCUMENTS

| JP | 2006-007991 A | 1/2006 |
| KR | 10-2008-0047691 A | 5/2008 |

* cited by examiner

*Primary Examiner* — Jason S Morrow
(74) *Attorney, Agent, or Firm* — Morgan, Lewis & Bockius LLP

(57) ABSTRACT

A mounting structure of a fender side cover, which is mounted between fenders disposed on both sides of a vehicle, a car body, and a hood hinge may include a hinge pin extending in a vehicle width direction on a side portion of the hood hinge, a rear mounting portion formed at a rear of the fender side cover and mounting the fender side cover to the hinge pin so as to be rotationally and laterally movable, and a front mounting portion formed on a front side of the fender side cover and inserted into a fender through-hole formed in the fender to couple the fender side cover to the fender, in which the fender side cover is mounted on the fender regardless of the type of the hood hinge and is moved along with the fender.

6 Claims, 6 Drawing Sheets

MOUNTING STRUCTURE OF FENDER SIDE COVER

CROSS-REFERENCE TO RELATED APPLICATION

The present application claims priority to Korean Patent Application No. 10-2013-157453 filed Dec. 17, 2013, the entire contents of which is incorporated herein for all purposes by this reference.

BACKGROUND OF THE INVENTION

1. Field of the Invention

The present invention relates to a mounting structure of a fender side cover mounted between fenders disposed on both sides of a vehicle and a car body, and more particularly, to a mounting structure of a fender side cover which includes a rear mounting portion configured to mount the fender side cover to a hinge pin in a rotationally and laterally movable manner, a front mounting portion inserted into a fender through-hole to couple the fender side cover to the fenders, and a mounting portion inserted into a car body through-hole to mount the fender side cover to the car body, and is mounted regardless of the type of a hood hinge to be able to absorb the assembling variation of the fender.

2. Description of Related Art

Generally, the vehicle is roughly constituted by a car body and a chassis, the chassis is a portion equipped with minimum mechanical devices that are necessary for the vehicle to run, and the car body is a portion forming an external form of the vehicle and is divided into an interior providing a boarding room of a passenger, an engine room equipped with an engine, and a trunk compartment capable of storing and transporting luggage.

When generally examining the external form of the vehicle, bumpers for protecting the car body are installed on the front and the rear of the vehicle, and fenders constituting the side surfaces of the vehicle are installed over tires of both side portions of the bumpers.

The fender refers to a mudguard that covers the tires of the vehicle, and is a component which forms the external form of the vehicle and serves to prevent foreign matters such as soil adhering to the tires from penetrating into the car body by the rotation of the tires.

Such a fender is divided into a front fender that wraps front tires installed on the front of the vehicle, and a rear fender that wraps rear tires installed on the rear of the vehicle, and among them, the present invention mainly relates to the front fender forming the external form of the front of the vehicle together with the hood, and this is simply referred to as a fender.

Figure 1:
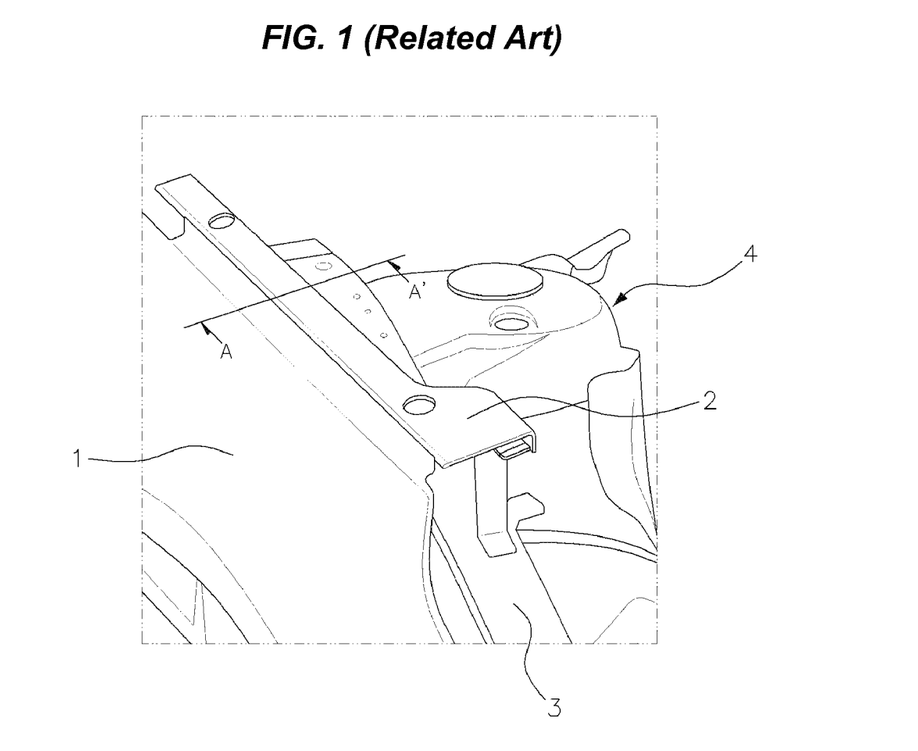
FIG. 1 a perspective view showing a conventional mounting structure of a fender side cover.
Figure 2:
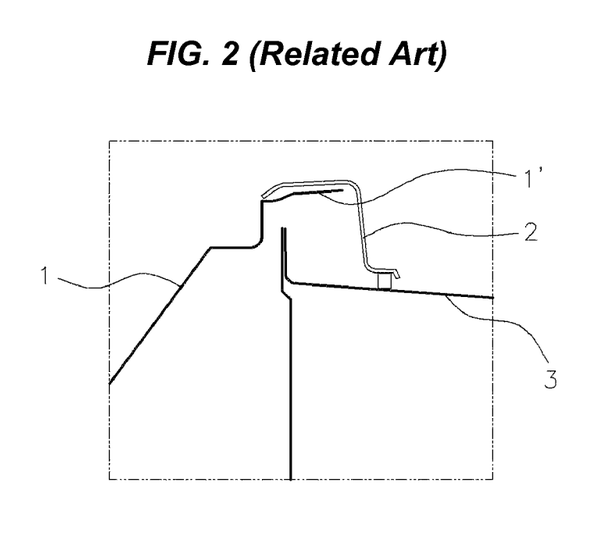
FIG. 2 is a cross-sectional view taken along a line of A-A' of FIG. 1.

As shown in FIGS. 1 and 2, fender aprons 3 for supporting force transmitted from a suspension are disposed on the left and right sides based on an engine room 4 of a vehicle, and a fender 1 wrapping the outer portion of the tire is coupled to the top of the fender apron 3 via a fender side cover 2.

The fender side cover 2 serves to connect the fender 1 and the fender apron 3 and to cover a gap between the fender 1 and the fender apron 3, and is generally fixed to the fender 1 and follows the assembling variation of the fender 1.

However, unlike the vehicle model having the mounting structure of the fender side cover shown in FIG. 2, in the case of a vehicle model in which a long flange 1' is not formed in the fender 1, that is, a vehicle model in which there is no room for the flange 1' of the fender 1, since the fender side cover 2 cannot sufficiently come into contact with the fender 1, there is a problem in that it is not possible to mount the fender side cover by the conventional mounting structure of the fender side cover.

Thus, there have been increased requests for a new mounting structure of a fender side cover which couples the fender side cover not only to the car body and the fender including the fender apron but also to the hood hinge so as to be able to mount the fender side cover regardless of the flange margin of the fender.

The hood hinge is a component that is coupled to both sides of the hood to allow the hood to rotationally move, and is roughly divided into a pedestrian protection type hood hinge equipped with an actuator for a pedestrian protection correspondence, and a general type hood hinge having no structure for pedestrian protection correspondence.

However, since the conventional mounting structure of the fender side cover cannot cope with both two types of hood hinges, it needs to be separately formed depending on the hood hinge type, and thus there are problems in that the assembling process becomes complicated, and the production costs and the assembly time increase.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a mounting structure of a fender side cover that can couple the fender side cover to the hood hinge and the fender, regardless of the type of hood hinge, and is mounted to a car body so that the fender side cover can absorb the assembling variation of the fender.

According to an aspect of the present invention, a mounting structure of a fender side cover which is mounted among fenders disposed on both sides of a vehicle, a car body, and a hood hinge, may include a hinge pin extending in a vehicle width direction on a side portion of the hood hinge, a rear mounting portion formed at a rear of the fender side cover and mounting the fender side cover to the hinge pin so as to be rotationally and laterally movable, and a front mounting portion formed on a front side of the fender side cover and inserted into a fender through-hole formed in the fender to couple the fender side cover to the fender, in which the fender side cover is mounted on the fender regardless of the type of the hood hinge and the fender side cover is moved in all directions along the movement of the fender.

Furthermore, the mounting structure of the fender side cover may further include a mounting portion formed at a front end of the fender side cover and inserted into a car body through-hole formed in the car body to mount the fender side cover to the car body.

The rear mounting portion may include a support portion extending to protrude downward from the rear of the fender side cover, and a "U-shaped" ring portion coupled to a distal end of the support portion in which the ring portion is rotatably inserted into the hinge pin.

The mounting portion may include a fixing portion fixedly coupled to the lower portion of the fender side cover and including a slot formed in the vehicle width direction, and a fastener having an upper end slidably housed in the fixing portion through the slot, and a lower end inserted into the car body through-hole, and the fastener, in which the fastener may slide in the vehicle width direction along the slot to absorb assembly variation in the vehicle width direction of the fender side cover.

The car body through-hole may extend in a longitudinal direction of the vehicle and house the fastener so as to be movable, and the fastener may slide in the longitudinal direction of the vehicle along the car body through-hole to absorb the assembling variation in the longitudinal direction of the fender side cover.

Additionally, the mounting structure of the fender side cover may further include a pair of disengagement preventing portions protruding toward an inward direction of the slot on both sides of the slot, in which the disengagement preventing portions preferably prevent the fastener from being disengaged to an outside of the slot.

An effect of the present invention having the structure as described above is to allow the fender side cover to be mounted to the fender, regardless of the type of hood hinge, by including the rear mounting portion coupled to the hinge pin extending to a side portion of the hood hinge so as to be rotationally movable and laterally movable, and the front mounting portion coupled to the fender.

That is, there is an effect in that it is able to mount the fender side cover by the same mounting structure regardless of the hood hinge of the pedestrian protection type and the general type hood hinge, and in that the fender side cover is moved based on the hinge pin to have a constant matching relationship with the fender.

Furthermore, there is an effect in that the assembling variation in a vehicle width direction and the assembling variation in a longitudinal direction of the fender side cover are absorbed, by allowing the fender side cover following the assembly variation of the fender to be mounted to the car body by the mounting portion constituted by a fixing portion and a fastener.

Furthermore, there is an effect in that the mounting relationship of the fender side cover is maintained, by providing a configuration in which a pair of disengagement preventing portions is formed on both side surfaces of the slot, the fastener is moved in the vehicle width direction along the slot, and even when the assembling variation of the fender side cover is absorbed, the fastener is prevented from being completely disengaged from the slot.

In addition, since there is no need to form a structure for separately mounting the fender side cover depending on the hood hinge type, there is an effect in that the assembling process is simplified, thereby reducing the production costs and the assembly time.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A mounting structure of a fender side cover mounted among fenders 20 disposed on both sides of a vehicle, a car body 10, and a hood hinge 30 may include a hinge pin 32 extending in a vehicle width direction on a side portion of the hood hinge 30, a rear mounting portion 50 that is formed at a rear of the fender side cover 40 and mounts the fender side cover 40 to the hinge pin 32 so as to be rotationally and laterally movable, and a front mounting portion 60 that is formed on the front one side of the fender side cover 40 and is inserted into a fender through-hole 22 formed in the fender 20 to couple the fender side cover 40 to the fender 20, in which the fender side cover 40 can be mounted to the fender 20 regardless of the type of the hood hinge 30 and can be moved in all directions along the movement of the fender 20.

Figure 3A:
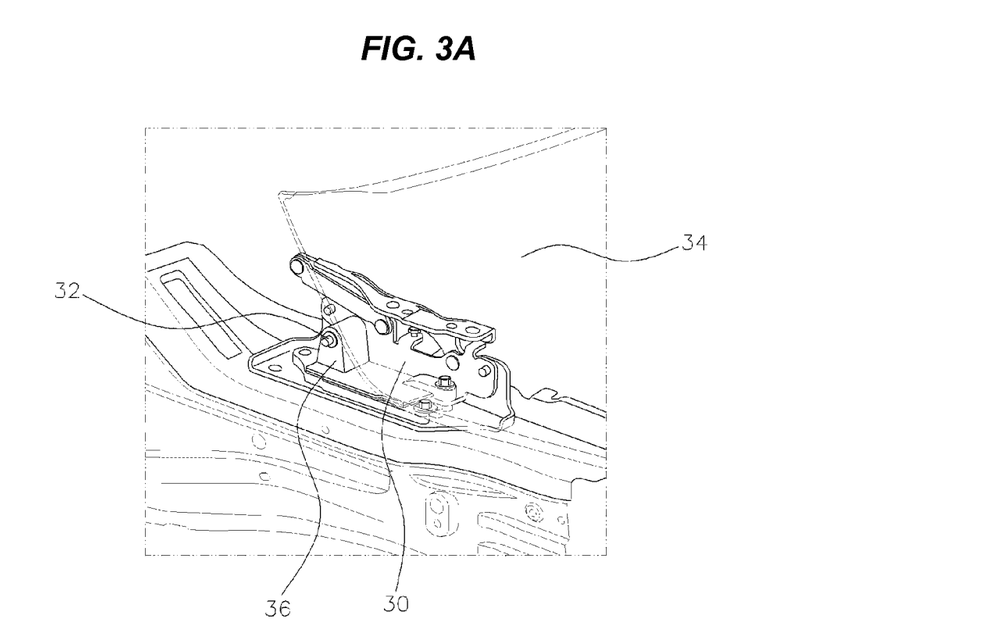
FIG. 3A is a perspective view showing an aspect of a hinge pin located in a pedestrian protection type hood hinge in an exemplary mounting structure of the fender side cover according to the present invention.
Figure 3B:
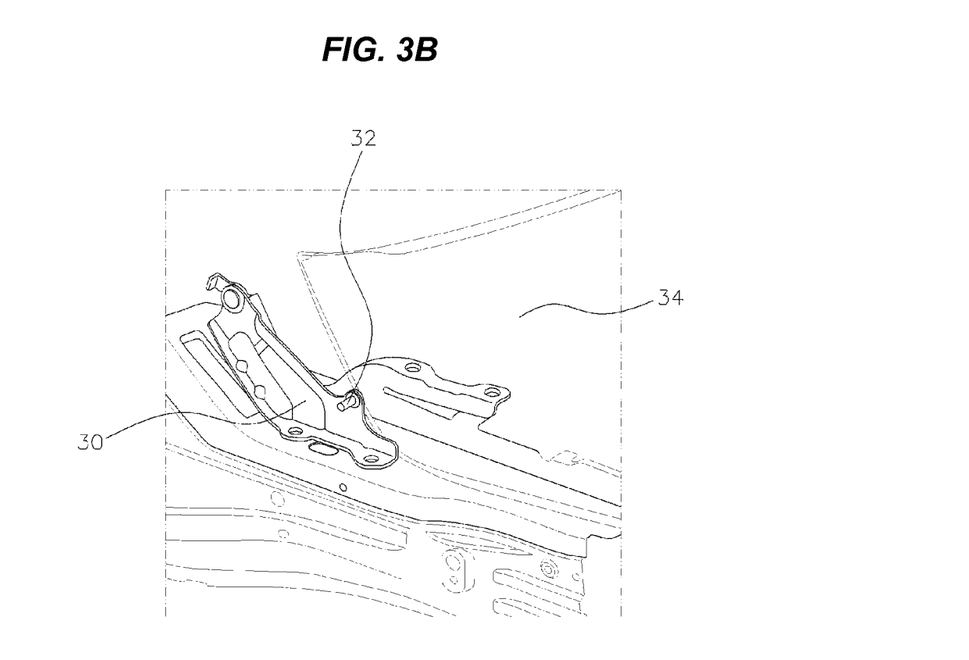
FIG. 3B is a perspective view showing an aspect of a hinge pin located in a general type hood hinge in the exemplary mounting structure of the fender side cover according to the present invention.

FIG. 3A is a perspective view showing an aspect of the hinge pin 32 located at a pedestrian protection type hood hinge 30 according to various exemplary embodiments of the present invention, and FIG. 3B is a perspective view showing an aspect of the hinge pins 32 located at a general type hood hinge 30 according to various exemplary embodiments of the present invention.

As shown in FIGS. 3A and 3B, the hood hinge 30 is installed on both sides based on an engine room of a vehicle, and a hood 34 is coupled to the top of the hood hinge 30 to open and close the top of the engine room.

The hood hinge 30 as described above is roughly divided into a pedestrian protection type hood hinge 30 shown in FIG. 3A and a general type hood hinge 30 shown in FIG. 3B, and the pedestrian protection type hood hinge 30 equipped with an actuator 36 having a structure that allows the hood 34 to protrude upward to protect pedestrians during rear-end accidents of the vehicle.

In the shown embodiment, it is understood that the pedestrian protection type hood hinge 30 has a four-joint link structure and the general type hood hinge 30 has a two-joint link structure, and thus the structures are different from each other.

However, on the side portion of the pedestrian protection type hood hinge 30 and the general type hood hinge 30 as described above, the hinge pin 32 extends in the vehicle width direction at the same location, regardless of the type.

Figure 4:
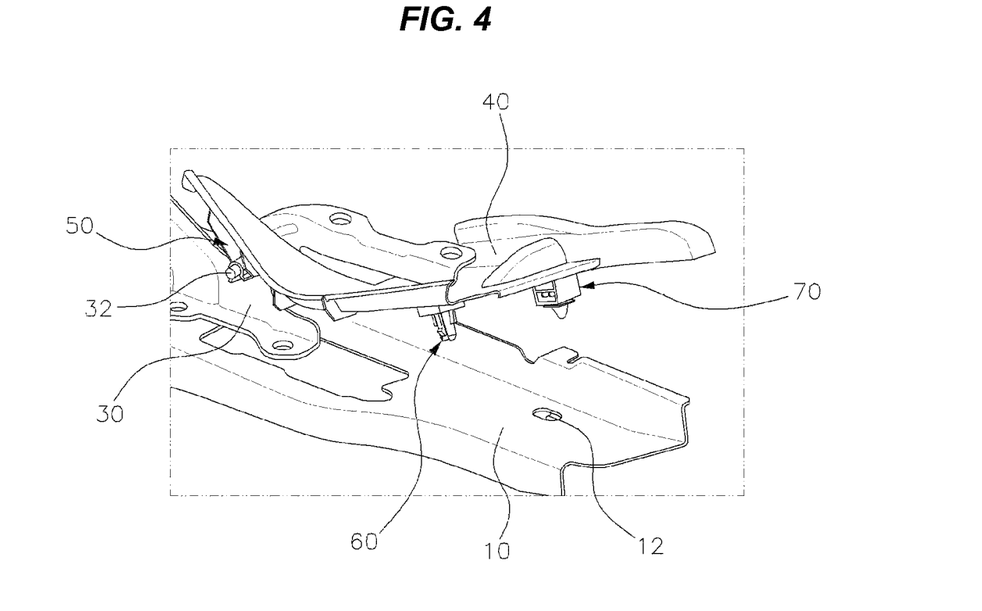
FIG. 4 is a perspective view showing an overall aspect of the exemplary mounting structure of the fender side cover according to the present invention.

As the hinge pin 32 is used as a bolt to couple the actuator 36 and the hood hinge 30 in the pedestrian protection type hood hinge 30, in the case of the general type hood hinge, there is no actuator 36, but the hinge pin is formed at the same position as the hinge pin 32 of the pedestrian protection type hood hinge 30 for mounting the fender side cover (40 of FIG. 4).

FIG. 4 is a perspective view showing the overall aspect of the mounting structure of the fender side cover according to various embodiments of the present invention.

As shown in FIG. 4, a rear mounting portion 50 coupled to the hinge pin 32 is formed at the rear of the fender side cover 40, and a front mounting portion 60 inserted and coupled to a fender through-hole (22 of FIG. 6) is formed at the front of the fender side cover 40.

The fender side cover 40 is coupled to the fender (20 of FIG. 6) by the front mounting portion 60 and is moved along the assembling variation of the fender 20, but the rear mounting portion 50 of the fender side cover 40 may be coupled to the hinge pin 32 so as to be laterally and rotationally movable.

Furthermore, the rear mounting portion 50 of the fender side cover 40 can be mounted to the fender 20 formed at the same position regardless of the type of the hood hinge 30, and thus, the fender side cover 40 can be mounted to the fender 20 regardless of the type of the hood hinge 30.

As shown in FIG. 4, a mounting portion 70 is formed at the front end of the fender side cover 40, and the mounting portion 70 is inserted into the car body through-hole 12 formed in the car body 10 to mount the fender side cover 40 to the car body 10.

That is, the fender side cover 40 serves to connect between the fender 20 of the vehicle and the car body 10 through the front mounting portion 60 and the mounting portion 70 and to cover a gap formed between the fender 20 and the car body 10.

Further, the fender side cover 40 has a three-point coupling structure that is coupled to each of the hinge pin 32, the fender 20, and the car body 10 through the rear mounting portion 50, the front mounting portion 60, and the mounting portion 70, and thus, has an effect in that supporting rigidity of the fender 20 is greatly increased.

Figure 5:
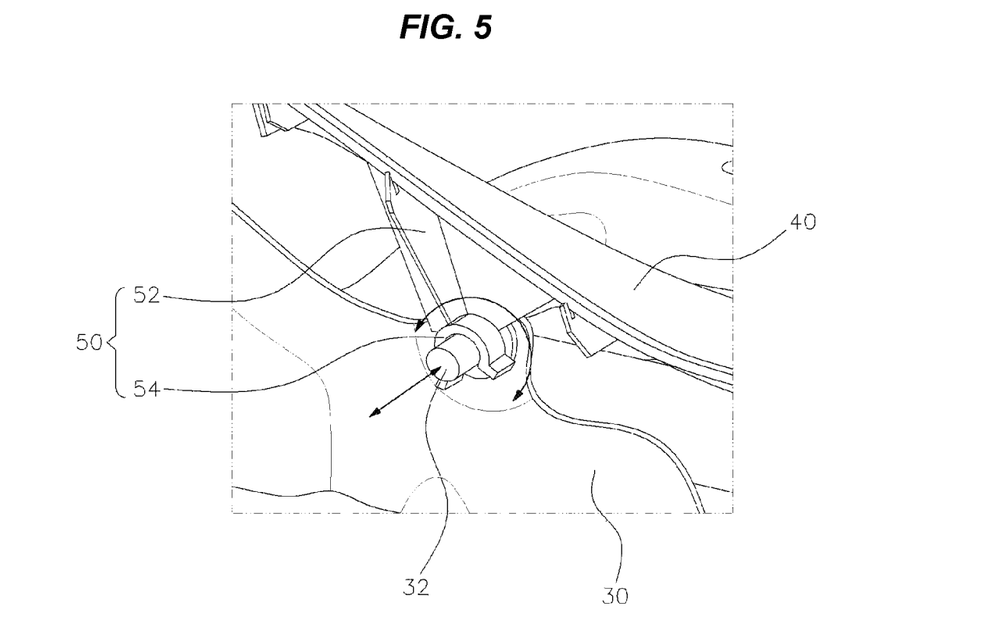
FIG. 5 is an enlarged perspective view showing an aspect of a rear mounting portion in the exemplary mounting structure of the fender side cover according to the present invention.

FIG. 5 is an enlarged perspective view showing an aspect of the rear mounting portion 50 in the fender side cover mounting structure according to various embodiments of the present invention.

As shown in FIG. 5, the rear mounting portion 50 is configured to include a support portion 52 extending to protrude downward from the rear of the fender side cover 40, and a "U-shaped" ring portion 54 coupled to a distal end of the support portion 52.

In various embodiments, the ring portion 54 may be made of a material having moderate elasticity, and one side located on the opposite side of the portion coupled to the support portion 52 is opened and inserted into the hinge pin 32.

The ring portion 54 is movable from side to side along a longitudinal direction of the hinge pin 32 while being loosely coupled to the hinge pin 32, and can be rotationally moved up and down based on the hinge pin 32.

Figure 6:
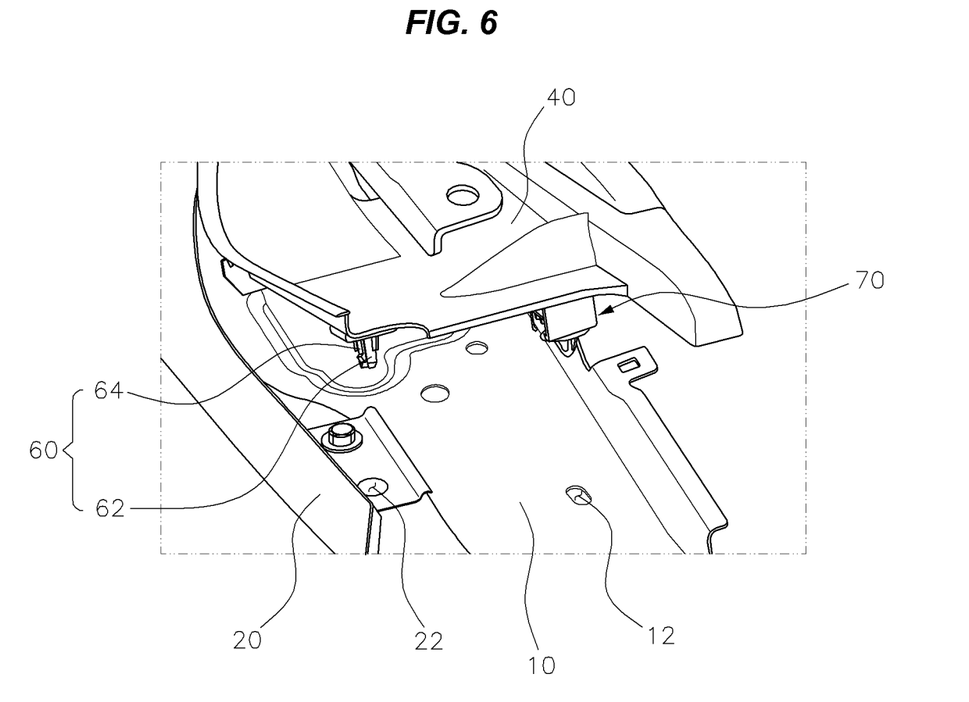
FIG. 6 is an enlarged perspective view showing an aspect of a front mounting portion and a mounting portion in the exemplary mounting structure of the fender side cover according to the present invention.

FIG. 6 is an enlarged perspective view showing an aspect of the front mounting portion 60 and the mounting portion 70 in the fender side cover mounting structure according to various embodiments of the present invention.

As shown in FIG. 6, the front mounting portion 60 is configured to include a pair of branched portions 62 that are branched into two parts below the fender side cover 40 and spaced apart from each other, and a pair of hook portions 64 that are disposed between the branched portions 62 and are movable side to side.

The hook portions 64 are connected by an elastic material such as a spring, when inserting the front mounting portion 60 into the fender through-hole 22 formed in the fender 20, after the hook portion 64 slightly enters the inside to prevent the front mounting portion 60 from being disengaged from the fender through-hole 22 while being pushed back by the spring, and thus, the fender side cover 40 and the fender 20 are coupled to each other.

Therefore, an assembling worker of the fender side cover 40 according to the present invention is able to couple the fender side cover 40 and the fender 20, through a simple process that rotates the fender side cover 40 in the state of coupling the rear mounting portion 50 to the hinge pin 32 to insert the front mounting portion 60 into the fender through-hole 22 with a felt of "click".

When rotating the fender side cover 40 as described above, the mounting portion 70 formed at the front end of the fender side cover 40 is inserted into the car body through-hole 12 to couple the fender side cover 40 to the car body 10.

Figure 7A:
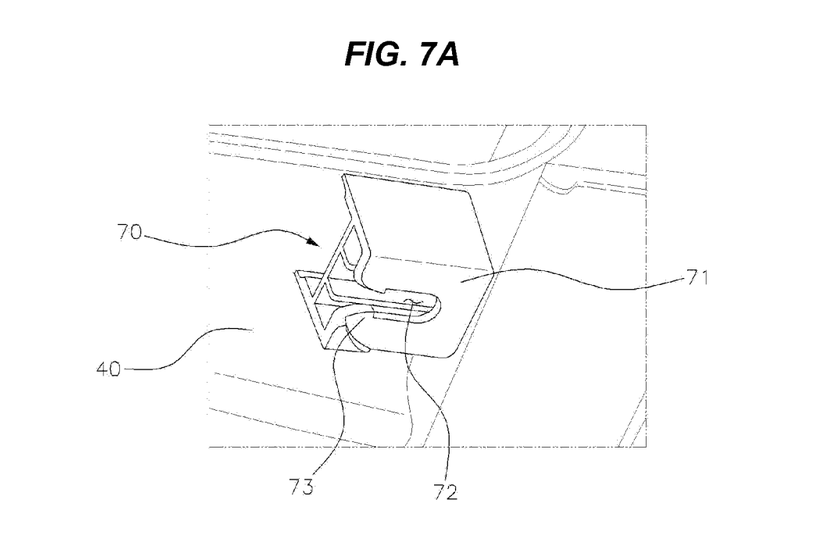
FIG. 7A is an enlarged perspective view showing an aspect of a fixing portion attached to a lower portion of a fender side cover in the exemplary mounting structure of the fender side cover according to the present invention.
Figure 7B:
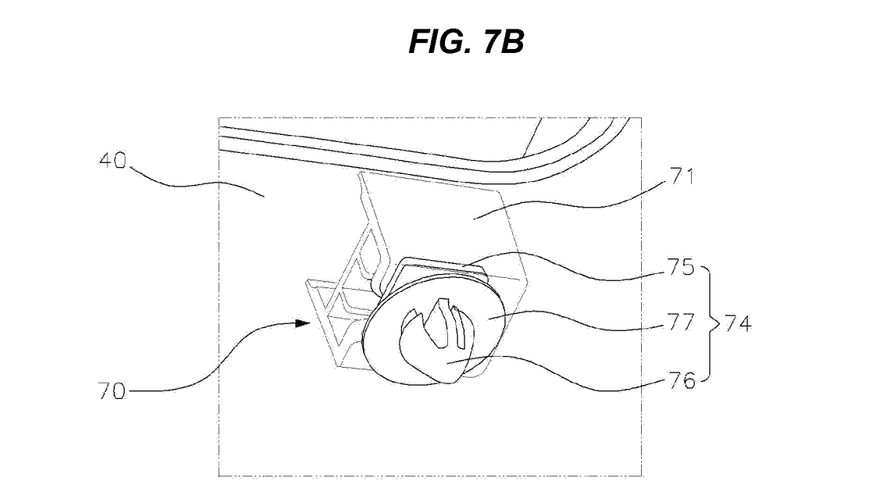
FIG. 7B is an enlarged perspective view showing an aspect of a fastener coupled to the fixing portion in the exemplary mounting structure of the fender side cover according to the present invention.

FIG. 7A is an enlarged perspective view showing an aspect of a fixing portion 71 attached to the lower portion of the fender side cover 40 according to various embodiments of the present invention, and FIG. 7B is an enlarged perspective view showing an aspect of a fastener 74 coupled to the fixing portion 71 according to various embodiments of the present invention.

As shown in FIG. 7A, the fixing portion 71 is formed by a hexahedron that is fixedly coupled to the lower portion of the fender side covers 40 and includes a slot 72 formed in the vehicle width direction in the lower end portion.

As shown in FIG. 7B, an upper end of the fastener 74 is slidably housed in the fixing portion 71 through the slot 72, and a lower end of the fastener 74 is inserted into the car body through-hole (12 of FIG. 6) and serves to mount the fender side cover 40 to the car body 10.

Specifically, the fastener 74 is constituted by a head portion 75 in the form of a square housed in the fixing portion 71, and a pin portion 76 is vertically coupled to the lower end of the head portion 75, and although it is not shown, the head portion 75 and the pin portion 76 are connected by a neck portion having a diameter of the same size as the width of the slot 72.

The head portion 75 formed in the square form has the same size as the cross-section of the fixing portion 71, and the pin portion 76 is desirably formed in a conical shape whose diameter is gradually increased as it goes towards a washer 77.

Furthermore, the washer 77, formed in an annular shape, may be disposed in the neck portion for connecting between the head portion 75 and the pin portion 76.

The fastener 74 including the head portion 75 and the pin portion 76 is slidable in the vehicle width direction along the slot 72 formed in the fixing portion 71, and thus, it is possible to absorb the assembling variation in the vehicle width direction of the fender side cover 40 that moves along the assembly variation of the fender 20.

As shown in FIG. 7A, a pair of disengagement preventing portions 73 may be formed to project toward the inner side of the slot 72 on both sides of the slot 72, and the disengagement preventing portions 73 serve as catching jaws to prevent the fastener 74 from being disengaged from the slot 72.

That is, the disengagement preventing portions 73 serve to prevent the fender side cover 40 and the car body 10 from being separated from each other due to the complete detachment of the fastener 74 from the slot 72, in the process of absorbing the assembling variation in the vehicle width direction while the fastener 74 is moved along the slot 72.

Figure 8:
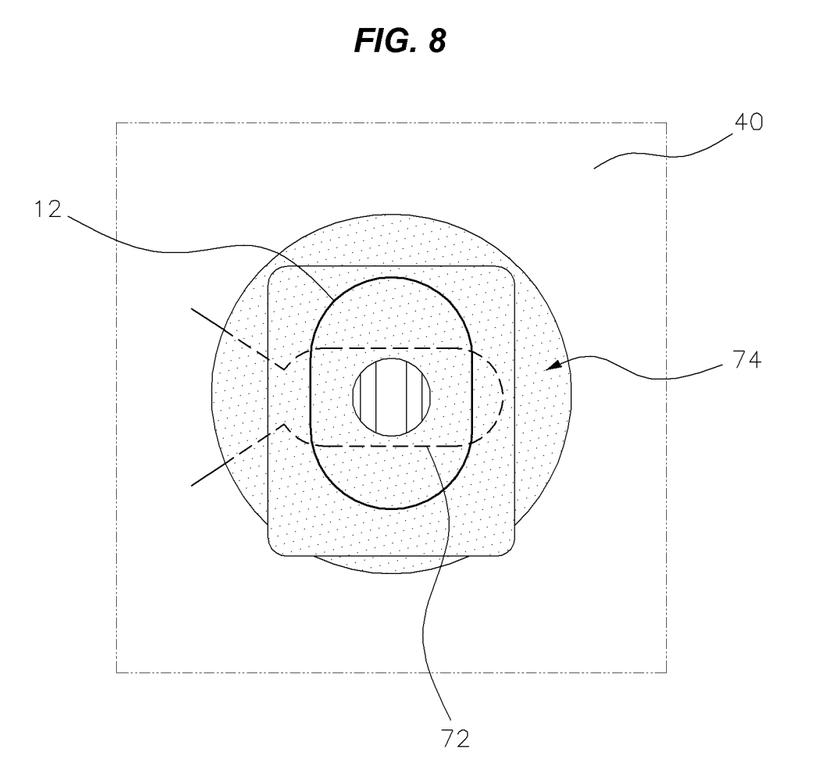
FIG. 8 is an enlarged bottom view showing an arrangement relationship between a car body through-hole and a mounting portion in the exemplary mounting structure of the fender side cover according to the present invention.

FIG. 8 is an enlarged bottom view showing a positional relationship between the car body through-hole 12 and the mounting portion 70 according to various embodiments of the present invention.

As shown in FIG. 8, the car body through-hole 12 formed to extend in a direction perpendicular to the arrangement direction of the slot 72, i.e., along the longitudinal direction of the vehicle, and the mounting portion 70 including the fixing portion 71 and the fastener 74 can be moved in the longitudinal direction along the car body through-hole 12.

That is, it is possible to absorb the assembling variation in the longitudinal direction of the fender side cover 40 moved along the assembling variation of the fender 20, as the fastener 74 slides in the longitudinal direction along the car body through-hole 12.

Thus, the mounting portion 70 including the fastener 74 and the fixing portion 71 has a structure in which the fender side cover 40 is movable in the vehicle width direction and the longitudinal direction and can be mounted to the car body 10 at the same time.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A mounting structure of a fender side cover which is mounted among fenders disposed on both sides of a vehicle, a car body, and a hood hinge, comprising:
    a hinge pin extending in a vehicle width direction on a side portion of the hood hinge;
    a rear mounting portion formed at a rear of the fender side cover and mounting the fender side cover to the hinge pin so as to be rotationally and laterally movable; and
    a front mounting portion formed on a front side of the fender side cover and inserted into a fender through-hole formed in the fender to couple the fender side cover to the fender,
    wherein the fender side cover is mounted on the fender and the fender side cover is moved along with movement of the fender.

2. The mounting structure of the fender side cover of claim 1, further comprising:
    a mounting portion formed at a front end of the fender side cover and inserted into a car body through-hole formed in the car body to mount the fender side cover to the car body.

3. The mounting structure of the fender side cover of claim 1, wherein the rear mounting portion includes:
    a support portion extending to protrude downward from the rear of the fender side cover; and
    a "U-shaped" ring portion coupled to a distal end of the support portion, wherein the ring portion is rotatably inserted onto the hinge pin.

4. The mounting structure of the fender side cover of claim 2, wherein the mounting portion includes:
    a fixing portion fixedly coupled to a lower portion of the fender side cover and including a slot formed in the vehicle width direction; and
    a fastener having an upper end slidably housed in the fixing portion through the slot, and a lower end inserted into the car body through-hole,
    wherein the fastener slides in the vehicle width direction along the slot to absorb assembly variation in the vehicle width direction of the fender side cover.

5. The mounting structure of the fender side cover of claim 4, wherein the car body through-hole extends in a longitudinal direction of the vehicle and houses the fastener in a movable state, and the fastener slides in the longitudinal direction of the vehicle along the car body through-hole to absorb the assembling variation in a longitudinal direction of the fender side cover.

6. The mounting structure of the fender side cover of claim 4, further comprising:
    a pair of disengagement preventing portions protruding toward an inward direction of the slot on both sides of the slot, wherein the disengagement preventing portions prevent the fastener from being disengaged to an outside of the slot.

* * * * *